3,085,933
GROWTH PROMOTANT SUBSTANCES
Maurice A. Schooley and Byron M. Shinn, Western Springs, Ill., assignors, by mesne assignments, to Armour & Company, Chicago, Ill., a corporation of Delaware
No Drawing. Filed Oct. 3, 1958, Ser. No. 765,045
14 Claims. (Cl. 167—53)

This invention relates to a novel composition which is useful as a growth promotant. More particularly this invention relates to an improved growth promoting factor comprising a combination of an estrogenic substance and a salt of a cationic surfactant.

It has been found that a number of so-called growth promoting substances when introduced into an animal either orally, by skin implantation, or otherwise, result in accelerated growth of the animal. Perhaps the best established of these substances are certain growth-stimulating antibiotics such as, for example, aureomycin. Since these substances apparently are not a normal nutritional requirement of animals, it is believed that their principal effect is to suppress diseases of the animals including those subclinical diseases which are not manifest. Animals thus treated, therefore, are more healthy and will tend to grow and gain weight at an increased rate.

In addition, as reported in the literature in this field, there are indications that other non-nutritional substances, principally surfactants, under certain conditions may also stimulate growth. It has been postulated that the growth promoting properties of surfactants may be related to their bactericidal and basteriostatic characteristics, and that, therefore, their action is similar to that of the antibiotics.

Another class of substances which fall within the category of growth promotants are estrogenic compounds. The growth and weight accelerating advantages of these substances has made their use desirable and profitable even though it has been recognized that their use presents certain inherent difficulties and hazards. One of the problems encountered in the livestock industry, for example, in employing estrogenic substances alone as a growth promotant has been the fact that in many instances their use will result in a downgrading of an animal into which they are introduced. The downgrading may occur to such an extent that even though more pounds of edible flesh are produced for each dollar invested in the raising of the animal, the total economic return from the sale of the animal for food purposes actually will be less than that received from animals which have not been treated with the estrogenic substance. Generally, this effect has dictated that the estrogens be introduced into animals at sufficiently low levels to reduce the problem of downgrading. However, at the lower levels the growth promoting results achieved may be substantially reduced.

Still another problem in the use of estrogenic substances arises in connection with their implantation in livestock destined for the market place. When thus introduced into an animal, some of the estrogenic material may remain in the edible portions of the animal, and, if such is the case, when ultimately consumed could produce an adverse effect in an individual.

It can be seen from this that it would be desirable to diminish the disadvantages encountered in the use of estrogenic substances without adversely affecting their growth promoting properties. Viewed in a different light, it would also be worth while if these disadvantages could be reduced and the growth promoting properties of the estrogenic substances maintained or even enhanced. We have discovered that these objects can be accomplished through the use of a combination of an estrogenic substance and a salt of a cationic surfactant. The net result of this combination is an increased feed efficiency and promotion of growth in animals into which it is introduced.

In accordance with the present invention, certain classes of surfactants which have been chemically modified so as to display substantially no surface activity in water, when combined with a minor amount of an estrogenic substance, demonstrate superior growth promoting properties while at the same time eliminating the disadvantages resulting from the use of the estrogenic substance alone. The mechanism of the action of this combination has not been elucidated, but the net effect is demonstratable and pronounced.

While a vraiety of active estrogenic substances may be employed to achieve the advantages of this invention, the stilbene derivatives are particularly suited. These preferred derivatives include such compounds as diethylstilbestrol, dienestrol, hexestrol; their lower alkyl ethers such as dianisylhexene, dianisylhexadiene and dianisylhexane; and esters such as dienestrol diacetate. Also contemplated by this invention are estrogen derivatives such as those comprising 4,4'-oxygenated stilbene derivatives or 4,4'-oxygenated diphenylhexane derivatives, said derivatives having at least two substituents in the aromatic nuclei, the substituents being made up of aliphatic straight chains containing at least two carbon atoms, branch chains, aromatic rings, and cyclic and heterocyclic rings. Specific examples of this last mentioned class of estrogen derivatives are 3,3'-diallyldiethylstilbestrol; 3,3'-diallylhexestrol; 3,3'-dipropylhexestrol; and 3,3'-dipropyldiethylstilbestrol. Of the derivatives defined, diethylstilbestrol is particularly effective. This compound, commonly referred to as stilbestrol, is a well-known synthetic organic chemical possessing estrogenic activity. It has been used principally as a therapeutic agent in medicine, where it is employed for its estrogenic properties.

The general class of modified surfactants having utility for the purpose of this invention can be designated as the substantially water-insoluble reaction product of the cationic fragment of a cationic surfactant with the anionic fragment of either an anionic surfactant or an anionic polyelectrolyte. The cationic fragment of these growth promotant materials may be derived from surface active quaternary ammonium salts, such as the alkyltrimethylammonium halides, dialkyldimethylammonium halides, trialkylmethylammonium halides, wherein the alkyl group (or groups) can contain from 8 to 22 carbon atoms and can be saturated or unsaturated. Instead of an alkyl group of the character described, the surface active quaternary ammonium compound can contain an aromatic group, such as the benzyl group, and thus the cationic fragment of this reaction product can be obtained from such compounds as alkylbenzyldimethylammonium halides. We mention, for example, such specific cationic surfactants from which this cationic fragment can be derived as dimethyldidodecylammonium chloride, trimethyldodecylammonium chloride, dimethyldioctadecylammonium chloride, trimethyloctadecylammonium chloride, dodecyldimethylbenzylammonium chloride, octadecyldimethylbenzylammonium chloride, (p-diisobutylphenoxyethoxy)ethylbenzenedimethylammonium chloride, trimethyloctylammonium chloride, dimethyldodecylbenzylammonium chloride and methyltrioctadecylammonium chloride. Also, mixtures of different cationic surfactants can be employed, such as the natural occurring mixtures where the quaternary ammonium compound is prepared from a natural fatty acid source. For example trimethyl-"coco"ammonium chloride, dimethyldi"tallow"ammonium chloride, trimethyl"soya"ammonium chloride, etc., are suitable sources for the cationic fragment of this reaction product. This cationic fragment may also be derived from surface active primary, secondary and tertiary amines, such as alkylamines, dialkylamines, dimethylalkylamines, bis(2-hydroxyethyl)alkylamines and N-alkyl-1,3-propanediamines, wherein the amines contain at least one alkyl chain having from 8 to 22 carbon atoms. By way of specific example, we mention such suitable amines as octadecylamine, dimethyloctadecylamine, bis(2-hydroxyethyl)octadecylamine, methyldioctadecylamine, dioctadecylamine, dimethyldodecylamine, and N-dodecyl-1,2-propanediamine. Further, polyamines, such as N-dodecyltrimethylenediamine and cyclic nitrogen compounds such as 1-alkylpyridinium halides, for example 1-octadecylpyridinium chloride, can be employed to derive the cationic fragment of this reaction product.

The anionic fragment of the substantially water-insoluble pyrolelectrolyte derivatives of the cationic surfactants having utility for the purpose of this invention may be derived from any anionic polyelectrolyte, such as polysulfonic acids, e.g., a hexasulfonic acid (Suramin) and polysulfonic acid resins (Amberlite IR–105); non-polymeric polysulfonic acids, e.g. acidic azo-dye such as Trypan Red and Direct Blue BB; polysulfuric esters, e.g. agar agar and carragheen mucilage; polycarboxylic acids; e.g. polyacrylic acid, weak cation exchange resins, arabic acid, alginic acid, pectic acid; polysaccharinic acids such as carboxymethylcellulose, oxidized starch, mucin, hyaluronic acid, polyglucuronic acid, and acids derived from naturally occurring gums such as tragacanth, locust bean, quince seed, linseed, karaya and acacia; mixed polycarboxylic acids and polysulfuric acid esters, e.g. heparin and chondroitin sulfuric acids; polyphosphonic acids, e.g. Duolite C-61; polyphosphoric acid esters, e.g. Duolite C-65 and phytic acid (hexaphosphoric acid ester); and polysilicates, e.g. bentonite.

The anionic fragment of the substantially water-insoluble anionic surfactant derivatives of the cationic surfactants contemplated by this invention may be derived from such compounds as fatty acids and soaps, i.e. sodium or potassium salts of a higher fatty acid, e.g. sodium stearate, potassium oleate, potassium octanoate, sodium decanoate, sodium laurate or other salts of fatty acids containing from 8 to 22 carbon atoms in which the hydrocarbon chains are either saturated or unsaturated. Also, this anionic fragment can be derived from such synthetic anionic surfactants as alkyl sulfates, alkyl sulfonates, alkyl aryl sulfonates and dialkyl sulfosuccinates. Further, such surface active compounds as cyclic acids, e.g. abietic and cholic, and acyl methyl taurides may be employed in producing this anionic fragment of the reaction product. By way of specific example of the type of synthetic anionic surfactants useful in forming the compounds of this invention, we mention dodecylsulfate, octadecylbenzenesodium sulfate, the ester of oleic acid, and hydroxy ethane sodium sulfonate.

In practicing this invention, the derivative of the cationic surfactant may be combined with the estrogenic substance merely by mixing them together in suitable proportions. It has been found that the range of concentration of the components of the combination is rather wide. Relatively small amounts of the active ingredients, for example, may be incorporated into nutrient materials, such as an animal feed or water, and still produce a highly desirable result in a short period of time.

Suitable carriers may be employed in the preparation of concentrates containing the combination of active ingredients. Examples of such carriers are soybean oil meal, cottonseed oil meal, and linseed oil meal. Bone meal also may be employed as a diluent when the combination is used for animal feeding purposes. The carrier facilitates uniform distribution of the active agents in the nutrient material with which the concentrates are blended.

The combination may advantageously be administered orally to both animals and humans as a tablet, capsule, suspension, etc. Skin implants are also contemplated for achieving the growth promotant effects of the combination.

This invention can be further illustrated by the following examples:

EXAMPLE I

A feeding trial lasting 112 days was conducted on steers and heifers to test the growth promotant properties of various concentrations of diethylstilbestrol (DES) and mixture of trialkylhexadecyl and trialkyloctadecylammonium stearate (TAS). The substances were introduced by skin implants and orally. The results of these tests are summarized in Tables I and II below:

Table I

| Lot Treatment | 1 Control | 2 DES, 36 mg. implant | 3 DES, 10 mg. daily | 4 TAS, control | 5 TAS DES, 36 mg. implant | 6 TAS DES, 10 mg. daily |
|---|---|---|---|---|---|---|
| No. steers | 13 | 12 | 13 | 13 | 12 | 12 |
| Av. Wt. (Lbs.): | | | | | | |
| Initial | 593 | 599 | 595 | 606 | 605 | 575 |
| Final | 855 | 889 | 889 | 880 | 925 | 866 |
| Gain | 262 | 290 | 294 | 274 | 320 | 291 |
| Daily gain | 2.33 | 2.59 | 2.63 | 2.45 | 2.85 | 2.60 |

Table II

| Lot Treatment | 1 Control | 2 DES, 18 mg. implant | 3 DES, 24 mg. implant | 4 TAS, control | 5 TAS DES, 18 mg. impl. | 6 TAS DES, 24 mg. impl. |
|---|---|---|---|---|---|---|
| No. heifers | 13 | 13 | 13 | 12 | 12 | 12 |
| Av. Wt. (Lbs.): | | | | | | |
| Initial | 594 | 595 | 587 | 581 | 572 | 587 |
| Final | 740 | 754 | 763 | 746 | 773 | 782 |
| Gain | 146 | 159 | 176 | 165 | 201 | 195 |
| Daily gain | 1.75 | 1.89 | 2.10 | 1.96 | 2.40 | 2.33 |

TAS fed at rate of 1.5 grams/head/day (steers and heifers).

Ration hand fed as follows:
  ⅔ rolled barley
  ⅓ dried molasses beet pulp
  Grass hay roughage
  1# 32% protein supplement pellets as follows:

|  | Pounds/ton |
|---|---|
| Wheat mixed feed | 650 |
| Soybean meal | 650 |
| Cottonseed meal | 350 |
| Urea | 30 |
| Dehydrated alfalfa | 100 |
| Di-calcium phosphate | 50 |
| Bone meal | 6 |
| Salt | 20 |
| Trace minerals | 5 |
| Molasses | 140 |

The steers in lot 5 receiving TAS and DES implants gained 22% more than controls, and 10% more than those implanted with DES alone. The heifers showed a similar pattern for this class of animals.

EXAMPLE II

Employing a slightly different ration from that of Example I, and a different level of TAS under feed lot conditions, the complementary effect of the combination of TAS and DES produced the results tabulated below:

|  | Group 1 Control | Group 2 36 mg. DES implant | Group 3 2 g. TAS | Group 4 TAS+36 mg. DES |
|---|---|---|---|---|
| No. steers | 20 | 20 | 20 | 20 |
| Av. Int. Wt. | 619 | 616 | 606 | 610 |
| Av. Final Wt. | 918 | 973 | 958 | 976 |
| Days on Teat | 101 | 101 | 101 | 101 |
| Av. Daily Gain | 2.97 | 3.54 | 3.48 | 3.63 |

Ration:

| | Percent |
|---|---|
| Barley | 45 |
| Cull peas | 17 |
| Cut pulp | 7.5 |
| Cane molasses | 5 |
| Salt | 0.5 |
| Alfalfa | 25 |

TAS alone (group 3) gave a 0.51 pound per head per day increase over the controls. DES alone (group 2) gave a 0.57 pound increase whereas the combination (group 4) increased gains 0.66 pound per head per day.

EXAMPLE III

Under field conditions in the summer months, the advantages of the combination of TAS and DES were shown as follows:

| | Lot 1—10 mg. DES daily | Lot 2—10 mg. DES daily, 1 gram TAS daily |
|---|---|---|
| No. steers | 19 | 19 |
| Av. starting wt | 731 | 742 |
| Av. final wt | 1,080 | 1,136 |
| Gain/steer | 349 | 394 |
| Av. daily gain (May 12-Aug. 31) | 3.14 | 3.55 |

Ration: 116—32% protein supplement/head/day.
Roughage:
Corn silage, alfalfa hay, 2 lbs. dried beet pulp plus grain mixture—

| | Percent |
|---|---|
| Corn | 25 |
| Wheat | 50 |
| Barley | 25 |

EXAMPLE IV

The same pattern as in the preceding examples was shown with a larger number of animals as follows:

| | Control | 2 g. TAS | 10 mg. DES daily | 2 g. TAS + 10 mg. DES daily |
|---|---|---|---|---|
| No. head | 112 | 115 | 118 | 113 |
| Av. Int. Wt | 767 | 772 | 767 | 770 |
| Av. Final Wt | 1022 | 1079 | 1082 | 1099 |
| Av. Daily Gain | 2.15 | 2.60 | 2.70 | 2.84 |
| Yield, percent | 61.79 | 62.17 | 61.91 | 61.58 |

EXAMPLE V

Employing a ration high in concentrates and self feeding the following results were obtained in a 160 day study:

| | 36 mg. DES implant | 36 mg. DES implant + 200 g. TAS/ton feed |
|---|---|---|
| No. animals | 14 | 12 |
| Initial Wt | 704 | 708 |
| Final Wt | 1114 | 1157 |
| Av. daily gain | 2.79 | 3.10 |
| Av. daily feed cons | 24.4 | 28.2 |
| Feed/100 lbs. gain | 875 | 908 |
| Percent Shrink | 3.57 | 4.36 |
| Dressing, percent | 60.90 | 62.71 |
| Av. Carcass Wt | 657.7 | 710.8 |
| Av. selling price cwt | 28.15 | 29.51 |
| Av. selling price/head | 304.07 | 334.51 |
| Av. carcass grade: | | |
| Choice + | 1 | 4 |
| Choice | 4 | 5 |
| Choice − | 4 | 1 |
| Good + | 2 | 0 |
| Good | 1 | 0 |

Ration:

| | Percent |
|---|---|
| Rolled shelled corn | 67.5 |
| Soybean oil meal | 10.0 |
| Ground alfalfa hay | 20.0 |
| Bone meal | 1.5 |
| Trace mineral salt | 1.0 |

EXAMPLE VI

Employing the same self feeding techniques as in Example V but using an all pelleted ration the following 112 day results in steers were obtained:

| Lot No. | 1 | 2 | 3 | 4 | 5 |
|---|---|---|---|---|---|
| Treatment: | | | | | |
| Self fed | X | X | X | X | X |
| Completed pelleted ration | 0 | X | X | X | X |
| Alfalfa hay long | X | 0 | 0 | 0 | 0 |
| Straw ad lib | 0 | 0 | X | X | X |
| TAS 200 g./ton | 0 | 0 | 0 | X | X |
| DES implants, 36 mg | 0 | 0 | 0 | 0 | X |
| No. steers | 8 | 8 | 8 | 8 | 8 |
| Initial wt | 527 | 520 | 511 | 526 | 526 |
| Final wt | 861 | 832 | 858 | 890 | 916 |
| Av. daily gain | 2.98 | 2.84 | 3.09 | 3.25 | 3.49 |

Composition of pelleted ration:

| | Percent |
|---|---|
| Barley | 40 |
| Beef pulp C.M. | 20 |
| Alfalfa ground | 30 |
| Wheat mixed feed | 5 |
| Molasses | 5 |

EXAMPLE VII

Finally the effects of TAS alone, DES alone and the combination of the two drugs were tested in steer calves on a constant intake of a wintering ration, as follows:

| Lot No. | 1 | 2 | 3 | 4 | 5 | 6 | 7 | 8 |
|---|---|---|---|---|---|---|---|---|
| Treatment: | | | | | | | | |
| TAS 0.59 orally | 0 | X | 0 | X | 0 | X | 0 | X |
| DES, 10 mg. orally | 0 | 0 | X | X | 0 | 0 | X | X |
| Terramycin | 0 | 0 | 0 | 0 | X | X | X | X |
| No. steers | 73 | 69 | 67 | 71 | 72 | 69 | 69 | 98 |
| Av. Int. Wt | 401 | 395 | 388 | 388 | 383 | 363 | 384 | 411 |
| Final wt | 556 | 575 | 568 | 595 | 570 | 562 | 580 | 616 |
| Gain | 155 | 180 | 180 | 207 | 187 | 199 | 196 | 205 |
| Daily gain | 1.31 | 1.53 | 1.53 | 1.75 | 1.58 | 1.69 | 1.66 | 1.74 |
| Feed/cwt. gain | 1,206 | 1,039 | 1,039 | 903 | 1,000 | 940 | 954 | 912 |

In preparing the animal feed materials described in the above examples, the combination of the estrogenic substance and the salt of a cationic surfactant were intimately mixed with another feed ingredient such as bone meal or limestone. An appropriate amount of this "premix" was then distributed throughout the entire feed in a feed mixer.

The growth promotant substances described herein not only speed up the growth of the animal, but also maintain the "grade" of the animal and improve the efficiency of feed conversion. This is an important advantage since it makes the growing process economical for animal raisers by requiring less feed per pound of weight gain while producing a high grade animal.

While in the foregoing specification various embodiments of this invention have been set forth and specific details thereof elaborated for the purpose of illustration, it will be apparent to those skilled in the art that the invention is susceptible to other embodiments and that many of these details may be varied widely without departing from the basic concept and spirit of the invention.

We claim:

1. A growth promoting composition of matter comprising a synthetic estrogenic substance and a substantially water-insoluble salt of a cationic surfactant said salt having substantially no surface activity in water.

2. A growth promoting composition of matter comprising a synthetic estrogenic substance and a substantially water-insoluble compound composed of a cationic fragment of a cationic surfactant and the anionic fragment of an anionic surfactant.

3. A composition as claimed in claim 2 in which the estrogenic substance is a stilbene derivative and the cationic surfactant is a quaternary ammonium surfactant.

4. A composition of matter as claimed in claim 3, in which said quaternary ammonium surfactant is a trimethyl alkyl ammonium compound in which the alkyl group contains from 8 to 22 carbon atoms.

5. A growth promoting composition of matter comprising a synthetic estrogenic substance and a substantially water-insoluble compound composed of a cationic fragment of a cationic surfactant and the anionic fragment of an anionic polyelectrolyte.

6. A composition as claimed in claim 5 in which the estrogenic substance is a stilbene derivative and the cationic surfactant is a quaternary ammonium surfactant.

7. A growth promoting composition of matter comprising a stilbene estrogenic derivative and a substantially water-insoluble salt of a trimethyloctadecylammonium surfactant said salt having substantially no surface activity in water.

8. A growth promoting composition of matter comprising diethylstilbestrol and trimethyloctadecylammonium stearate.

9. An animal nutrient material characterized by containing as its essential active ingredient a combination of a synthetic estrogenic substance and a substantially water-insoluble salt of a cationic surfactant said salt having substantially no surface activity in water.

10. An animal nutrient material characterized by containing as its essential active ingredients a combination of diethylstilbestrol and trimethyloctadecylammonium stearate.

11. A growth promoting composition of matter comprising a synthetic estrogenic substance and mixtures of substantially water-insoluble salts of cationic surfactants said salts having substantially no surface activity in water.

12. A growth promoting composition of matter comprising diethylstilbestrol and a mixture of trimethylhexadecylammonium stearate and trimethyloctadecylammonium stearate.

13. An animal nutrient material characterized by containing as its essential active ingredients the combination of a synthetic estrogenic substance and mixtures of substantially water-insoluble salts of cationic surfactants said salts having substantially no surface activity in water.

14. A nutrient material characterized by containing as its essential active ingredients the combination of diethylstilbestrol and a mixture of trimethylhexadecylammonium stearate and trimethyloctadecylammonium stearate.

References Cited in the file of this patent

UNITED STATES PATENTS

| 2,550,914 | Cunkelman | May 1, 1951 |
| 2,844,466 | Rogers | July 22, 1958 |

OTHER REFERENCES

O'Mary: J. of Animal Science, vol. 11, No. 4, November 1952, pages 656–659.

Stern: Poultry Science, vol. 32, No. 1, January 1953, pages 26–28.